United States Patent [19]

Bond

[11] Patent Number: 4,899,270
[45] Date of Patent: Feb. 6, 1990

[54] DC-TO-DC POWER SUPPLY INCLUDING AN ENERGY TRANSFERRING SNUBBER CIRCUIT

[75] Inventor: Eric D. Bond, Burnaby, Canada

[73] Assignee: Statpower Technologies Corp., Burnaby, Canada

[21] Appl. No.: 322,903

[22] Filed: Mar. 14, 1989

[51] Int. Cl.$^4$ ............................................. H02H 7/122
[52] U.S. Cl. ........................................ 363/56; 363/21
[58] Field of Search .................. 363/20, 21, 56, 97, 363/131

[56] References Cited

U.S. PATENT DOCUMENTS

| | | | |
|---|---|---|---|
| 4,276,588 | 6/1981 | McLyman et al. | 363/56 |
| 4,336,587 | 6/1982 | Boettcher, Jr. et al. | 363/56 X |
| 4,355,353 | 10/1982 | Farrer | 363/21 |
| 4,365,171 | 12/1982 | Archer | 363/20 X |
| 4,378,586 | 3/1983 | Bete | 363/56 |
| 4,438,486 | 3/1984 | Ferraro | 363/21 X |
| 4,561,046 | 12/1985 | Kuster | 363/56 X |
| 4,607,322 | 8/1986 | Henderson | 363/56 |
| 4,675,796 | 6/1987 | Gautherin et al. | 363/20 |
| 4,675,797 | 6/1987 | Vinciarelli | 363/21 |

FOREIGN PATENT DOCUMENTS 0210871  9/1986  Japan .

*Primary Examiner*—Patrick R. Salce
*Assistant Examiner*—Kristine Peckman
*Attorney, Agent, or Firm*—Shlesinger & Myers

[57] ABSTRACT

A DC to DC power supply including an energy transferring snubber circuit produces a changing magnetic flux by opening and closing a switching element to interrupt current flow in a first inductor. A current is induced in a second inductor in response to the changing magnetic flux. A first capacitor is charged with a current due to a first potential appearing across the switching element when the switching element is opened. The current induced in the second inductor and the current from the first capacitor is conducted to the load when the switching element is closed. A snubber circuit minimizes the first potential appearing across the switching element while transferring energy to the load.

15 Claims, 1 Drawing Sheet

DC-TO-DC POWER SUPPLY INCLUDING AN ENERGY TRANSFERRING SNUBBER CIRCUIT

BACKGROUND OF THE INVENTION

The invention relates to high efficiency DC-to-DC switching power supplies and snubber circuits therefor.

It has long been known to provide a direct current to direct current (DC-to-DC) converter by switching current in a primary circuit to induce current at a higher voltage in a secondary circuit. Many circuits have been devised to sufficiently smooth the resulting secondary current to a level tolerable by the circuit load. Some of such circuits use a centre tapped transformer and two diodes which act to alternately direct current on each half waveform to charge a capacitor for bulk storage of energy to be supplied to the load. These circuits require an expensive transformer having a tapped winding, expensive switching devices and at least two diodes to achieve their goal. Such circuits may be found in U.S. Pats. 4,336,587 (Boettcher) and 4,276,588 (McLyman et Al).

Simpler secondary circuits have been devised and some illustrated in U.S. Pat. Nos. 4,365,171 (Archer); 4,355,353 (Farrer); 4,561,046 (Kuster) and 4,438,486 (Ferraro). The circuits shown in these patents all use the principle of half wave rectification and have the advantage that a simpler and cheaper transformer and a single diode are all that are required to charge the bulk storage capacitor. Unfortunately, these circuits have a disadvantage in that energy is transferred to the storage capacitor only on one half of the secondary voltage waveform. Thus, all of the energy of the first half of the waveform is lost.

Another problem encountered in virtually all DC-to-DC converters is the build up of extremely high voltages across a switching element in the primary circuit. As illustrated by the above patents, the switching element is used in the primary circuit to create increasing and decreasing current flow and hence increasing and decreasing magnetic flux in the primary winding. The primary winding, however, induces a voltage depending upon the rate of change of magnetic flux and therefore at the instant of switching the primary circuit open, the rate of change of flux is greatest and hence the voltage across the primary winding is greatest. This voltage simultaneously appears across the switching element which can lead to rapid degradation of the switching element.

Snubber circuits have been previously devised to reduce the voltage exerted across the switching element by providing a circuit path of reduced impedance. Such a circuit path allows the primary winding to be discharged while reducing the voltage across the switching element. Typically however, snubber circuits merely appear as a short circuit to the primary winding and thus energy due to the discharge of the primary winding manifests itself as heat in the snubber circuit.

SUMMARY OF THE INVENTION

The present invention reduces the problem of energy loss during the first half of the secondary waveform while at the same time providing a snubber circuit to relieve voltage stress on the switching element in the primary circuit.

The present invention provides a direct current to direct current power supply including a power conductor and a reference conductor connectable to a power source. Flux producing means is provided for producing a changing magnetic flux and for producing a first potential, the flux producing means including a first inductor and a switching element for interrupting electric current flow through the first inductor, the first inductor and the switching element being connected in series with the power conductor and the reference conductor. A first capacitor is provided for storing electric charge and for developing a second potential in response to the stored electric charge, the first capacitor being connected to the reference conductor. First means is provided for permitting electric current flow from the producing means to the first capacitor and for blocking electric current flow from the first capacitor to the producing means, the first means being connected between the producing means and the first capacitor. A second inductor is provided for inducing a third potential in response to the changing magnetic flux, the second inductor being magnetically coupled to the producing means and being connected in series with the first capacitor to add the second potential to the third potential to produce a combined potential. An output conductor is provided for supplying an output current at an output voltage to a load connected between the output conductor and the reference conductor. A second means is provided for permitting electric current flow from the second inductor to the output conductor and for blocking electric current flow from the output conductor to the second inductor, the second means being operatively connected to the second inductor and the output conductor.

The present invention also provides a method of supplying a current to a load, the method comprising the steps of:

(a) producing a changing magnetic flux by opening and closing a switching element to interrupt current flow in a first inductor;

(b) inducing a current in a second inductor in response to the changing magnetic flux;

(c) charging a first capacitor with a current due to a first potential appearing across the switching element when the switching element is opened;

(d) conducting current induced in the second inductor and current from the first capacitor to the load when the switching element is closed.

DETAILED DESCRIPTION

Figure 1:
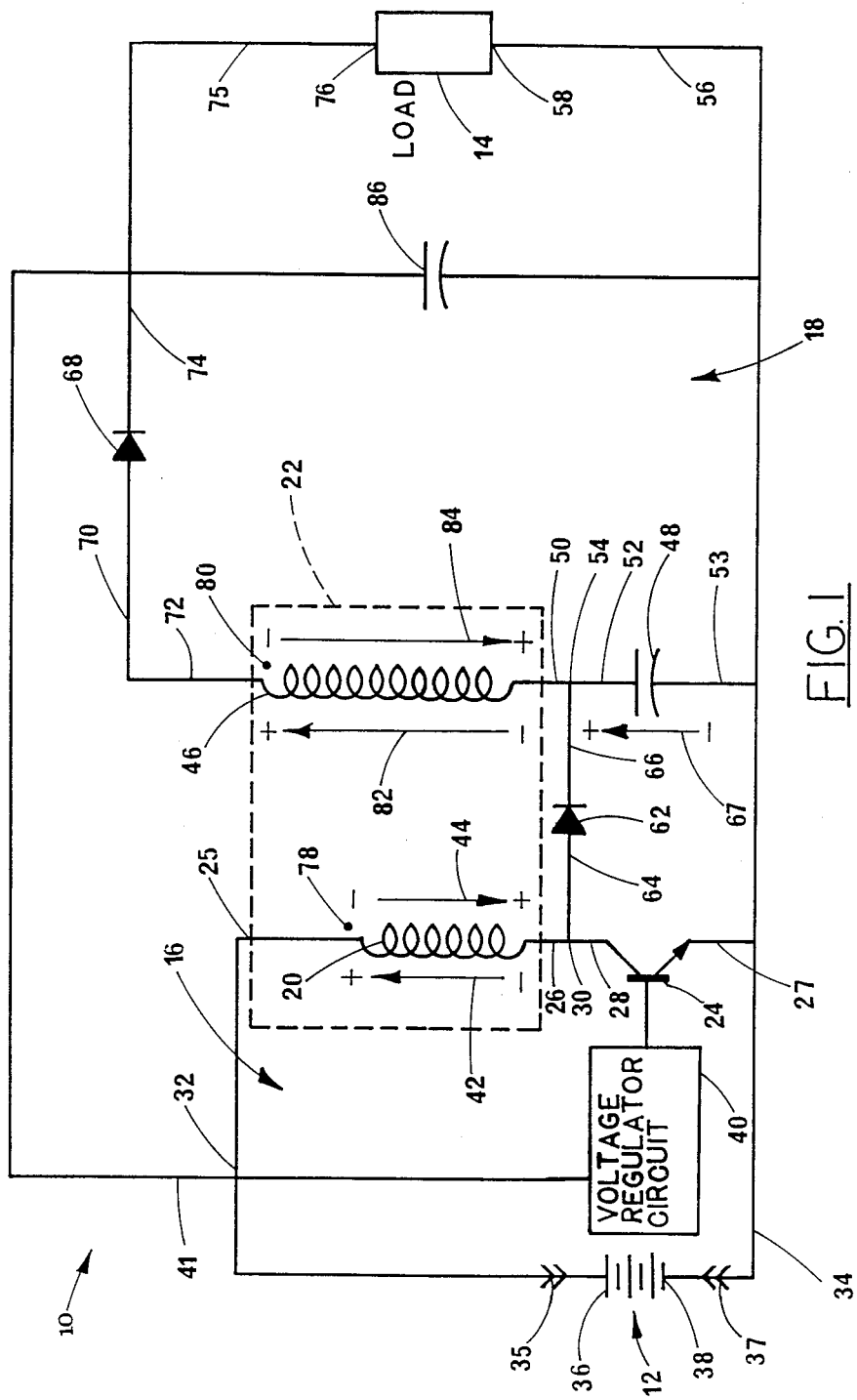
FIG. 1, the sole Figure, is a schematic diagram of a circuit according to the invention.

A DC-to-DC power supply is shown in schematic form in FIG. 1. The power supply includes a circuit shown generally at 10. The components of the circuit are mounted on a printed wiring board (PWB) in this embodiment but may alternatively be hard wired together in any other practical manner.

The circuit is connected to a battery 12 and a load 14, the battery and load being external to the circuit. In this embodiment the battery 12 acts as a power source. In an alternative embodiment the power source may be any electric power source having an output voltage of unipolar polarity. The voltage and current capacity of the source are chosen to be consistent with the power demand of the load 14 and do not affect the operation of the circuit. In this embodiment the battery supplies approximately 10 amperes of current at a voltage of 12 volts.

The load may be a resistive or capacitive load as commonly found in portable electronic devices. Alternatively, the load may be inductive such as found in motorized devices.

In the preferred embodiment, the circuit includes PWB trace 32 and PWB trace 34 which are connected to input terminals 35 and 37 of a screw terminal block. The input terminals serve to connect wires from a positive terminal 36 and a negative terminal 38 of the battery 12 to PWB traces 32 and 34. PWB trace 32 thus acts as a power conductor connectable to a power source and PWB trace 34 acts as a reference conductor connectable to a power source.

The circuit 10 further includes a primary circuit 16 and a secondary circuit 18. The primary circuit 16 includes a primary winding 20 of a transformer 22. The primary winding is connected in series with a transistor 24. The primary winding 20 and the transistor 24 are connected to each other by printed wiring board traces 26 and 28 respectively thereby forming a first circuit node which shall hereinafter be referred to as a first connection point 30.

The primary winding 20 is connected to PWB trace 32, the power conductor, by PWB trace 25. Transistor 24 is connected to PWB trace 34, the reference conductor, by PWB trace 27. PWB traces 27 and 28 act as first connecting means for connecting the transistor to the first connection point and the reference conductor. PWB traces 25 and 26 act as second connecting means for connecting the primary winding to the first connection point and the power conductor.

A voltage regulator circuit 40 is connected by PWB trace 41 to an output conductor 74 of the circuit. The voltage regulator circuit 40 is also connected to the transistor 24. Voltage regulator 40 monitors the voltage appearing on the output conductor 74 and supplies a control signal to the transistor 24. The control signal switches the transistor into and out of conduction at an appropriate switching frequency and duty cycle to maintain a constant voltage at the output conductor 74 and hence across the load 14. The transistor effectively opens and closes the primary circuit 16 at a frequency and duty cycle determined by the control signal. In the preferred embodiment, a constant switching frequency of 120 kHz and a duty cycle capable of varying between 0 and 80 percent have proven to be effective for loads demanding up to one ampere of current at 160 volts.

When the transistor 24 is switched into conduction, current flows in the primary circuit 16. Using conventional current flow rules, current flows from the positive terminal 36 of the battery 12, through the primary winding 20, through the transistor 24, and back to the battery 12 via the reference terminal 38. When the transistor 24 initially switches into conduction, the current in the primary circuit increases and hence an increasing magnetic flux is created. This increasing magnetic flux causes a first potential to be developed in the primary winding 20. This first potential is in a direction tending to oppose the increase in current as indicated by polarity arrow 42.

When the transistor 24 is switched out of conduction, the primary circuit 16 is open whereby current cannot complete the primary circuit and therefore the flow of current is interrupted. The transistor thus acts as a switching element for interrupting current flow in the primary circuit 16. In an alternative embodiment the transistor may be replaced by any other power switching device capable of switching the current in the primary circuit at frequencies in the Kilohertz range.

When the transistor 24 initially switches out of conduction, the current in the primary circuit decreases and hence the magnetic flux in the primary winding 20 decreases. In this case, the first potential developed by primary winding 20 is of a polarity tending to oppose the decrease in current as indicated by polarity arrow 44.

Generally, the primary circuit 16 including the primary winding 20 and the transistor 24 and associated printed wiring board traces all act as producing means for producing a changing magnetic flux and for producing a first potential.

The secondary circuit 18 includes a secondary winding 46 of the transformer 22. The secondary winding 46 is connected in series with a first capacitor 48. The secondary winding 46 and the first capacitor 48 are connected by printed wiring board traces 50 and 52 respectively thereby forming a second circuit node which shall hereinafter be referred to as a second connection point 54.

PWB trace 53 connects the first capacitor 48 to PWB trace 34, the reference conductor. Traces 52 and 53 thus act as third connecting means for connecting the first capacitor 48 between the second connection point 54 and the reference conductor. PWB trace 56 further connects the reference conductor 34 to a reference terminal 58 of the load 14.

The circuit 10 further includes a first diode 62 connected by printed wiring board traces 64 and 66 between the first connection point 30 and the second connection point 54. The diode 62 is poled to conduct current from the first connection point 30 to the second connection point 54.

Current will only flow in the forward direction through the first diode 62 when the potential or voltage measured between the first connection point 30 and the reference conductor 34 is greater than the voltage measured between the second connection point 54 and the reference conductor (neglecting any voltage drop across the first diode). Such a difference in voltage occurs when the transistor 24 is initially switched out of conduction whereupon the first potential developed by the primary winding 20 is of the polarity indicated by arrow 44. The first potential thus causes a current to flow from the primary circuit 16 to the secondary circuit 18 when the transistor is switched out of conduction and the magnetic flux in the primary winding 20 is decreasing.

Current flowing in the forward direction through the diode 62 enters the first capacitor 48. The first capacitor stores electric charge due to this current flow and develops a second potential in response to the charge stored, the second potential having a polarity indicated by arrow 67. The first capacitor acts to store energy in the form of electric charge and acts to develop a second potential in response to the charge stored.

When the first potential drops to a value below the second potential, current no longer flows in the forward direction but rather, the second potential attempts to cause a current flow in the reverse direction. Current flow in the reverse direction is blocked by the first diode 62 and thus current cannot flow from the secondary circuit 18 to the primary circuit 16. The first diode 62 provides first means for permitting electric current flow from the producing means to the first capacitor and for blocking electric current flow from the first capacitor to the producing means.

The secondary winding 46 of the transformer 22 is further connected by printed wiring board traces 70 and 72 to a second diode 68. The second diode 68 is further connected to printed wiring board trace 74, the output conductor. PWB trace 74 is further connected by PWB trace 75 to a demand terminal 76 of the load 14. The second diode 68 permits electric current flow from the second inductor to the output conductor and blocks electric current flow from the output conductor to the second inductor. Second diode 68 thus acts as second means for permitting electric current flow from the second inductor to the output conductor and for blocking electric current flow from the output conductor to the second inductor.

The secondary winding 46 is magnetically coupled by the transformer 22 to the primary winding 20. The secondary winding acts as a second inductor operable to develop a third potential in response to increasing and decreasing magnetic flux. As will be apparent from dots 78 and 80, current flowing into the primary winding 20 at dot 78 causes a current flowing out of the secondary winding at dot 80. Similarly, current flowing in the opposite direction in the primary winding causes current to flow in the opposite direction in the secondary winding. Thus, the polarity of the third potential corresponding to the polarity of the first potential is indicated by polarity arrows 82 and 84, wherein arrow 42 corresponds to arrow 82 and arrow 44 corresponds to arrow 84.

When the magnetic flux in the transformer 22 is decreasing, the third potential has a polarity indicated by arrow 84 which attempts to cause a current to flow through the first capacitor 48 and through the load 14. Current cannot flow in this direction, however, due to the blocking action of the second diode 68.

When the magnetic flux is increasing, the third potential developed by the secondary winding 46 has a polarity as indicated by arrow 82. Printed wiring board traces 50 and 52 which connect together the first capacitor 48 and the secondary winding 46 cause the second potential developed by the first capacitor to be added to the third potential developed by the secondary winding to produce a combined potential. The combined potential causes a current to flow through the second diode 68, thereby supplying current and energy to the load 14.

The magnetic flux produced by the primary winding 20 increases and decreases at different and varying rates, depending upon the switching duty cycle of the transistor 24 as controlled by the voltage regulator 40. Consequently, the third potential developed across the secondary winding 46 is not constant but varies in time. Furthermore, as the first capacitor 48 discharges while the magnetic flux is increasing, the second potential also varies in time. The combined potential tending to cause current to flow to the load therefore also varies in time. In the preferred embodiment, a second capacitor 86 is connected between PWB trace 74, the output conductor and PWB trace 34, the reference conductor in an attempt to smooth out the variations in the combined potential thereby reducing ripple in the output voltage appearing across the load 14.

Operation

The operation of the circuit 10 may be explained by first considering that the voltage regulator circuit 40 is monitoring the output voltage appearing on PWB trace 74, the output conductor. The voltage regulator provides the control signal to the transistor 24 which effectively opens and closes the primary circuit 16 to interrupt current flowing through the primary winding 20. This interruption in current flow produces a changing magnetic flux.

At the instant of switching the transistor 24 out of conduction, current flow in the primary circuit 16 tends to decrease from an instantaneous value toward zero. Consequently, the magnetic flux also tends to decrease. This decreasing magnetic flux causes the first potential appearing across the primary winding 20 to assume a polarity indicated by arrow 44. The first potential also appears across the transistor 24.

Depending upon the number of turns of the primary winding 20 and on the rate of decrease of magnetic flux, the first potential as indicated by the arrow 44 causes a current to flow through the first diode 62 and into the first capacitor 48. The first capacitor is thus charged with a current due to the first potential appearing across the transistor when the transistor is switched out of conduction.

At the same time as the first capacitor is charging, the secondary winding 46 develops the third potential having a polarity indicated by arrow 84. This third potential tends to oppose any flow of current in the forward direction through the second diode 68 and therefore the current flow from the primary circuit 16 to the secondary circuit 18 is substantially directed to the first capacitor 48.

Upon switching the transistor 24 into conduction, Current flows in the primary circuit 16 from the battery 12, through the primary winding 20, through the transistor 24 and back to the battery 12. No current flows through the first diode 62 as the conduction of the transistor 24 brings the voltage at the first connection point 30 to a value less than the voltage appearing at the second connection point 54 due to the charge on first capacitor 48.

At the instant of switching the transistor 24 into conduction, the current flow in the primary circuit 16 tends to rise from zero toward a steady state DC value determined by the resistance of the primary circuit 16. This rise or increase in current causes an increasing magnetic flux in the transformer 22 and induces the third potential having a polarity indicated by arrow 82 in the secondary winding 46. A current is induced in the secondary winding 46 in response to the changing magnetic flux.

The third potential is combined with the second potential to produce the combined potential which causes current flow through the second diode 68 to the load 14. Current will continue to flow to the load even after the first capacitor 48 is discharged, provided the magnetic flux continues to increase. Typically, however, the voltage regulator 40 will switch the transistor 24 out of conduction before the magnetic flux reaches a steady state value.

The first diode 62 and the first capacitor 48 effectively serve as a snubber circuit which supplies energy to the load. Each time the switching element is opened, the first potential appearing across the switching element causes current to flow through the first diode 62 to charge the first capacitor 48. When the switching element is closed, current is effectively conducted from the first capacitor to the load. Thus, the energy stored in the primary winding when the transistor is opened is transferred first to the first capacitor and then to the load. The constant charging and discharging of the first capacitor 48 tends to keep the voltage appearing at the first connection point 30 to a value tolerable by the transistor 24. Consequently a transistor having a low collector-emittor breakdown voltage can be employed as the switching element in the circuit.

While a specific embodiment of the invention has been described, such an embodiment should be considered illustrative of the invention only and not as limiting the scope of the invention as construed in accordance with the accompanying claims.

What is claimed is:

1. A direct current to direct current power including:
   (a) a power conductor and a reference conductor connectable to a power source;
   (b) flux producing means for producing a changing magnetic flux and for producing a first potential, the flux producing means including a first inductor and a switching element for interrupting electric current flow through the first inductor, the first inductor and the switching element being connected in series with the power conductor and the reference conductor;
   (c) a first capacitor for storing electric charge and for developing a second potential in response to the stored electric charge, the first capacitor being connected to the reference conductor;
   (d) first means for permitting electric current flow from the producing means to the first capacitor and for blocking electric current flow from the first capacitor to the producing means, the first means being connected between the producing means and the first capacitor;
   (e) a second inductor for inducing a third potential in response to the changing magnetic flux, the second inductor being magnetically coupled to the producing means and being connected in series with the first capacitor to add the second potential to the third potential to produce a combined potential;
   (e) an output conductor for supplying an output current at an output voltage to a load connected between the output conductor and the reference conductor;
   (f) second means for permitting electric current flow from the second inductor to the output conductor and for blocking electric current flow from the output conductor to the second inductor, the second means being operatively connected to the second inductor and the output conductor.

2. A power supply as claimed in claim 1 wherein the first means includes a first diode operatively connected to the producing means and the first capacitor.

3. A power supply as claimed in claim 1 wherein the producing means includes a control circuit for varying a duty cycle of the switching element in response to power demand of the load, the control circuit being operatively connected to the switching element and the output conductor.

4. A power supply as claimed in claim 1 wherein the switching element includes a transistor.

5. A power supply as claimed in claim 1 wherein the producing means includes:
   (a) a first connection point;
   (b) first connecting means for connecting the switching element to said first connection point and the reference conductor;
   (c) second connecting means for connecting the first inductor to said first connection point and the power conductor.

6. A power supply as claimed in claim 5 further including:
   (a) a second connection point;
   (b) third connecting means for connecting the first capacitor to the second connection point and the reference conductor;
   (c) fourth connecting means for connecting the second inductor to the second connection point and the second means.

7. A power supply as claimed in claim 6 wherein the first means is operatively connected to the first connection point and the second connection point.

8. A power supply as claimed in claim 7 wherein the first means includes a first diode operatively connected to the first connection point and the second connection point.

9. A power supply as claimed in claim 1 wherein the first inductor and second inductor include primary and secondary windings respectively of a transformer.

10. A power supply as claimed in claim 1 further including a second capacitor for reducing ripple in the output voltage, the second capacitor being connected between the output conductor and the reference conductor.

11. A power supply as claimed in claim 1 wherein the second means includes a second diode operatively connected to the second inductor and the output conductor.

12. A method of supplying current to a load, the method comprising the steps of:
   (a) producing a changing magnetic flux by opening and closing a switching element to interrupt current flow in a first inductor;
   (b) inducing a current in a second inductor in response to the changing magnetic flux;
   (c) charging a first capacitor with a current due to a first potential appearing across the switching element when the switching element is opened;
   (d) conducting current induced in the second inductor and current from the first capacitor to the load when the switching element is closed.

13. A method as claimed in claim 12 further comprising the steps of monitoring the voltage at the load and varying a duty cycle of the switching element to maintain the voltage at the load within predetermined limits.

14. A method as claimed in claim 12 further comprising the steps of charging a second capacitor with a portion of the total of the current induced in the second inductor and the current from the first capacitor when the switching element is closed and conducting current from the second capacitor to the load when the switching element is opened.

15. A method of reducing voltage stress across a switching element in a switching circuit for supplying power to a load, the method comprising the steps of:
   (a) charging a first capacitor with a current due to a first potential appearing across the switching element is opened;
   (b) conducting current from the first capacitor to a load when the switching element is closed;
   (c) charging a second capacitor with a portion of the current from the first capacitor when the switching element is closed and conducting current from the second capacitor to the load when the switching element is open.

* * * * *